United States Patent
Yasukawa et al.

(10) Patent No.: US 7,218,993 B2
(45) Date of Patent: May 15, 2007

(54) ROBOT SYSTEM AND AUTONOMOUS MOBILE ROBOT

(75) Inventors: Yusuke Yasukawa, Kawasaki (JP); Masayasu Hino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/028,445

(22) Filed: Jan. 4, 2005

(65) Prior Publication Data
US 2005/0159841 A1    Jul. 21, 2005

Related U.S. Application Data

(63) Continuation of application No. PCT/JP02/10382, filed on Oct. 4, 2002.

(51) Int. Cl.
*G06F 19/00* (2006.01)

(52) U.S. Cl. ............. 700/245; 700/247; 700/248; 700/251; 700/257; 700/258; 700/259; 700/260; 700/26; 700/262; 700/264; 318/568.12; 318/568.13; 318/568.16; 318/568.21; 318/568.25; 600/117; 600/118; 600/407; 600/426; 600/429; 600/587; 606/1; 606/102; 606/130; 606/139; 901/1; 901/2; 901/27

(58) Field of Classification Search ............. 700/245
See application file for complete search history.

(56) References Cited

U.S. PATENT DOCUMENTS

| | | | | |
|---|---|---|---|---|
| 4,887,223 A | * | 12/1989 | Christian | 382/153 |
| 4,940,925 A | * | 7/1990 | Wand et al. | 318/587 |
| 5,802,494 A | * | 9/1998 | Kuno | 705/2 |
| 6,438,457 B1 | * | 8/2002 | Yokoo et al. | 700/245 |
| 6,487,500 B2 | * | 11/2002 | Lemelson et al. | 701/301 |
| 6,548,982 B1 | * | 4/2003 | Papanikolopoulos et al. | 318/568.11 |
| 6,925,357 B2 | * | 8/2005 | Wang et al. | 700/245 |
| 7,142,945 B2 | * | 11/2006 | Wang et al. | 700/245 |
| 7,142,947 B2 | * | 11/2006 | Wang et al. | 700/264 |
| 7,158,859 B2 | * | 1/2007 | Wang et al. | 700/245 |
| 7,164,969 B2 | * | 1/2007 | Wang et al. | 700/245 |
| 7,164,970 B2 | * | 1/2007 | Wang et al. | 700/245 |
| 2003/0216834 A1 | * | 11/2003 | Allard | 700/245 |

FOREIGN PATENT DOCUMENTS

| | | |
|---|---|---|
| JP | 60-063698 | 4/1985 |
| JP | 63-101998 | 5/1988 |
| JP | 8-7186 | 1/1996 |
| JP | 8-223560 | 8/1996 |
| JP | 2001-61138 | 3/2001 |
| JP | 2001-245069 | 9/2001 |

* cited by examiner

*Primary Examiner*—Thomas Black
*Assistant Examiner*—McDieunel Marc
(74) *Attorney, Agent, or Firm*—Staas & Halsey LLP

(57) ABSTRACT

A robot system is provided and includes an autonomous mobile robot. In the system in which monitoring is performed using the autonomous mobile robot which travels along a predetermined path, an interval between the time when a user requests transmission of images and the time when the user obtains the images may be reduced. The autonomous mobile robot travels along a predetermined path at predetermined times, a camera takes photographs at predetermined locations during the travel along the predetermined path, images taken by the camera are stored, and the stored images are sent to a requesting cell phone in response to a transmission request from the cell phone.

22 Claims, 13 Drawing Sheets

(a) Patrol the house at predetermined times (take photographs at predetermined fixed points, photograph any suspicious object, and make recordings)

(b) Accumulate photographed images and recorded sounds at station (c) Send accumulated data upon request from user on the Internet

FIG.3

| Patrol start time | Patrol route number |
|---|---|
| 10 : 00 | A |
| 12 : 00 | B |
| 15 : 00 | A |

Operation timetable

FIG.4

| Patrolling sequence | Places to be checked | Still image | Moving image | Photographing direction | Re-cording | Shooting/recording time | Brightness measurement |
|---|---|---|---|---|---|---|---|
| 1 | Living room | ○ | × | South, 10° up | × | − | ○ |
| 2 | Living room | × | ○ | East, 0° up | ○ | 1 min. | × |
| 3 | Kitchen | ○ | × | East, 30° up | × | − | ○ |
| 4 | Japanese-style room | ○ | × | South, 20° up | × | − | ○ |
| 5 | Bedroom | ○ | × | North, 20° up | × | − | ○ |
| 6 | Living room | × | × | − | × | − | × |

Patrol Schedule

FIG.5

A suspicious object has been detected.
Please check.

Message

ROBOT SYSTEM AND AUTONOMOUS MOBILE ROBOT

TECHNICAL FIELD

This application is a continuing application, filed under 35 U.S.C. §111(a), of International Application PCT/JP02/10382, filed Oct. 4, 2002.

The present invention relates to a robot system which includes a freely movable autonomous mobile robot as well as to the freely movable autonomous mobile robot.

BACKGROUND ART

Recently, the issue of security has been a great concern even in households and the like, for example, and various monitoring systems have been devised.

For example, a system has been proposed which involves installing cameras at home, changing the directions of the cameras while away from home using a cell phone, transferring images taken by the cameras to the cell phone, and displaying the images on a display screen of the cell phone (see, for example, Patent Document 1).

Also, a system has been proposed which involves installing abnormality detection sensors and cameras, placing a call to the user's cell phone if any abnormality is detected by any of the abnormality detection sensors, sending a message about the abnormality to the cell phone, and allowing the user to view images taken by the cameras on the cell phone (see, for example, Patent Document 2).

[Patent Document 1]
Japanese Patent Laid-Open No. 2001-61138
[Patent Document 2]
Japanese Patent Laid-Open No. 2001-245069

When installing a system which monitors an empty home during the user's absence using one of the conventional monitoring systems, if the user wants to monitor a particular room or a small number of monitoring points, only a few cameras need to be installed, but if the user wants to monitor a large number of places scattered in the house including the open/close states of windows and the front door, on/off states of air conditioners and lighting apparatus, etc., a large number of cameras need to be installed, which may result in a complicated and extremely expensive system.

To solve this problem, it is conceivable to install a freely movable autonomous mobile robot equipped with a camera, program the robot with a map of the house, and instruct the robot via a cell phone to photograph one or more particular places in the house and send resulting images when the user wants to know conditions in the house while the user is out. The robot moves to the specified place according to the instructions, takes photographs, and sends resulting images to the user's cell phone. This allows the user to display the received images on the display screen of the cell phone and check the conditions of the specified place in the house. In this case, although the robot itself incurs cost, no additional camera other than the one mounted on the robot is required. Also, if there are a large number of places to be monitored in various directions, this configuration may cost less than installing cameras in a large number of places. Besides, the robot will be desirable if it makes the user feel as if it were a pet, doll, or the like.

However, if a robot such as the one described above is used, when the user operates the cell phone to check out conditions in the house, the robot must move to a specified place, take a photograph, and send the image unlike when a camera is installed in each of many places, and thus it is likely that there is a considerable time delay before the user obtains an image of the specified place especially if the robot is originally located away from the specified place. This may make the user feel irritated.

In view of the above circumstances, the present invention has an object to provide a robot system and autonomous mobile robot that can reduce the interval between the time when a command is given and the time when images can be viewed.

DISCLOSURE OF THE INVENTION

To achieve the above object, the present invention provides a robot system having an autonomous mobile robot which is freely movable and a station which wirelessly communicates with the autonomous mobile robot, wherein:

the autonomous mobile robot has a travel mechanism which moves the robot, a camera which photographs surroundings, a control section which makes the autonomous mobile robot travel along a predetermined path at predetermined times and makes the camera take photographs at predetermined locations during the travel along the predetermined path, and a sending section which sends the images taken by the camera to the station; and the station has a receiving section which receives the images sent from the autonomous mobile robot, a storage section which stores the images received by the receiving section, and a communications section which communicates with external devices via a communications line and sends the images stored in the storage section to a requesting external device in response to a transmission request from the external device.

With the robot system according to the present invention, the autonomous mobile robot travels along a predetermined path at predetermined times (e.g., at predetermined time intervals) and takes photographs and the resulting images are sent to the station and stored in the storage section without waiting for a command from an external device such as a cell phone. Consequently, upon receiving an image transmission command from an external device such as a cell phone the robot system can send images stored in the storage section immediately to the external device, allowing the user to obtain the images in a very short period of time after giving the command.

The camera may take moving images as well as still images.

Also, the sending section may send images via a wireless LAN.

Preferably, the autonomous mobile robot has a storage section which stores the images taken by the camera and the sending section sends the images stored in the storage section when communications with the receiving section of the station are enabled.

This configuration allows the autonomous mobile robot to collect images by traveling to places where the autonomous mobile robot cannot communicate with the station.

Preferably, the autonomous mobile robot in the robot system has a suspicious-object detecting section which detects suspicious objects whose existence is not expected. In that case, preferably, the control section makes the camera photograph any suspicious object detected by the suspicious-object detecting section. Alternatively, it is preferable that the sending section of the autonomous mobile robot notifies the station about detection of any suspicious object and that the communications section of the station sends a message about the detection of the suspicious object to the external device.

Available algorithms for detection of suspicious objects are not limited to a particular algorithm. They include, for example, an algorithm which involves storing a detailed map, conducting constant monitoring with a camera while in motion, detecting any object not registered in the map, and regarding the detected object as a suspicious object; and an algorithm which involves conducting monitoring with a camera while in motion, detecting any moving object in images through image processing, and regarding the moving object as a suspicious object.

In the robot system according to the present invention, preferably the autonomous mobile robot has a sound sensor which collects sounds; the control section makes the sound sensor collect sounds at predetermined locations when the autonomous mobile robot is traveling along the predetermined path, and the sending section sends the sounds collected by the sound sensor to the station; the receiving section of the station receives the sounds sent from the autonomous mobile robot, the storage section stores the sounds received by the receiving section, and the communications section sends the sounds stored in the storage section to the requesting external device.

Furthermore, in the robot system according to the present invention, preferably the autonomous mobile robot has an environmental sensor which detects conditions of surrounding environment, the control section makes the environmental sensor detect conditions of surrounding environment at predetermined locations when the autonomous mobile robot is traveling along the predetermined path, and the sending section sends environmental information obtained by the environmental sensor to the station; and the receiving section of the station receives the environmental information sent from the autonomous mobile robot, the storage section stores the environmental information received by the receiving section, and the communications section sends the environmental information stored in the storage section to the requesting external device.

The environmental sensor is not limited to any type as long as it detects conditions of surrounding environment. Available environmental sensors include, for example, a temperature sensor, humidity sensor, brightness (light) sensor, odor sensor such as a gas sensor, and noise sensor.

To achieve the above object, the present invention provides a first autonomous mobile robot which is freely movable, having: a travel mechanism which moves the robot; a camera which photographs surroundings; a control section which makes the autonomous mobile robot travel along a predetermined path at predetermined times and makes the camera take photographs at predetermined locations during the travel along the predetermined path; a storage section which stores the images taken by the camera; and a communications section which communicates with external devices via a communications line and sends the images stored in the storage section to a requesting external device in response to a transmission request from the external device.

The first autonomous mobile robot combines the autonomous mobile robot of the robot system according to the present invention and functionality of the station (in this case, there is no need for communications between the autonomous mobile robot and the station and thus, communications configuration is omitted). Therefore, various aspects of the robot system according to the present invention are applicable to the first autonomous mobile robot according to the present invention as aspects of the first autonomous mobile robot without departing from the spirit of the present invention.

To achieve the above object, the present invention provides a second autonomous mobile robot, having: a travel mechanism which moves the robot; a camera which photographs surroundings; a control section which makes the autonomous mobile robot travel along a predetermined path at predetermined times and makes the camera take photographs at predetermined locations during the travel along the predetermined path; and a communications section which communicates with an external image server connected via a communications line and sends the images taken by the camera to the external image server, where the external image server sends images to external devices in response to requests from the external devices.

Whereas the autonomous mobile robot of the robot system according to the present invention sends images to the station within the robot system, the second autonomous mobile robot according to the present invention sends images directly to the external image server connected via a communications line instead of the station. In this case, users of external devices such as cell phones are supposed to make image transmission requests to the image server.

Again, various aspects of the robot system according to the present invention are applicable to the second autonomous mobile robot according to the present invention as aspects of the second autonomous mobile robot without departing from the spirit of the present invention.

As described above, in a configuration in which monitoring is performed using an autonomous mobile robot which travels along a predetermined path, the present invention can reduce the interval between the time when a user requests transmission of images or the like and the time when the user obtains the images.

BRIEF DESCRIPTION OF THE DRAWINGS

FIG. 3 is a diagram outlining an operational sequence of the robot system shown in FIG. 1.

FIG. 4 is a diagram showing an operation timetable.

FIG. 5 is a diagram showing an example of a patrol schedule.

BEST MODE FOR CARRYING OUT THE INVENTION

Embodiments of the present invention will be described below.

Figure 1:
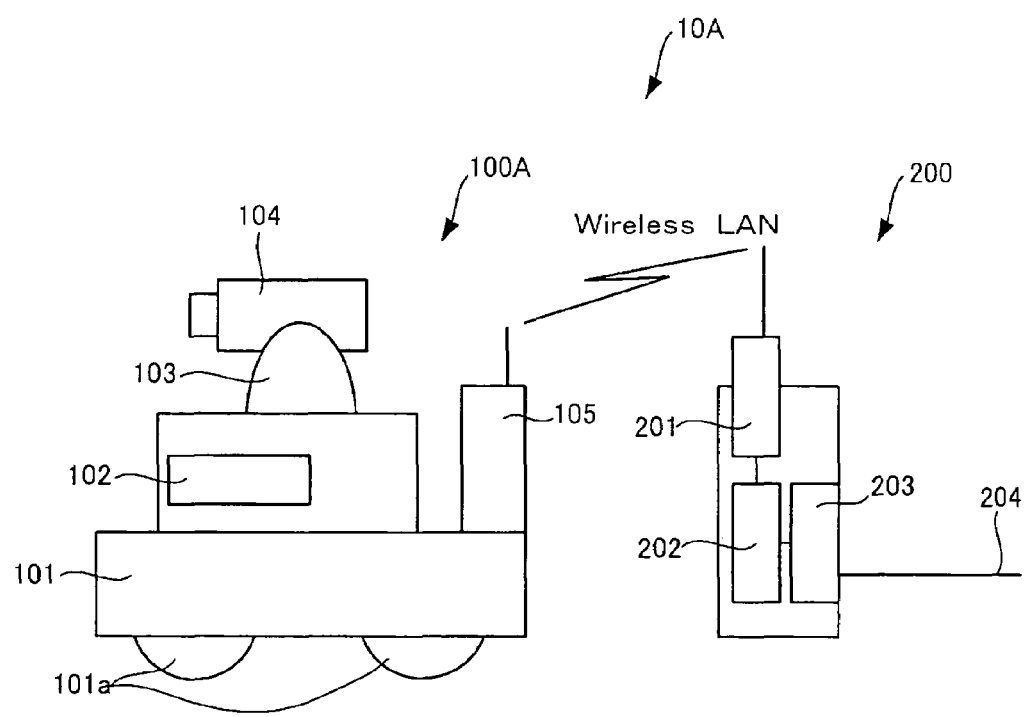
FIG. 1 is a diagram showing a first embodiment of a robot system according to the present invention.

FIG. 1 is a diagram showing a first embodiment of a robot system according to the present invention.

The robot system 10A in FIG. 1 includes an autonomous mobile robot 100A and station 200 (sometimes referred to as a terminal 200 in the following description).

The autonomous mobile robot 100A has a travel mechanism 101, sensor 102, swiveling/nodding mechanism 103, camera 104, and wireless transmitter 105.

The travel mechanism 101 has wheels 101a with which the autonomous mobile robot 100A advances, retreats, and turns, moving around freely, for example, in a house.

Figure 2:
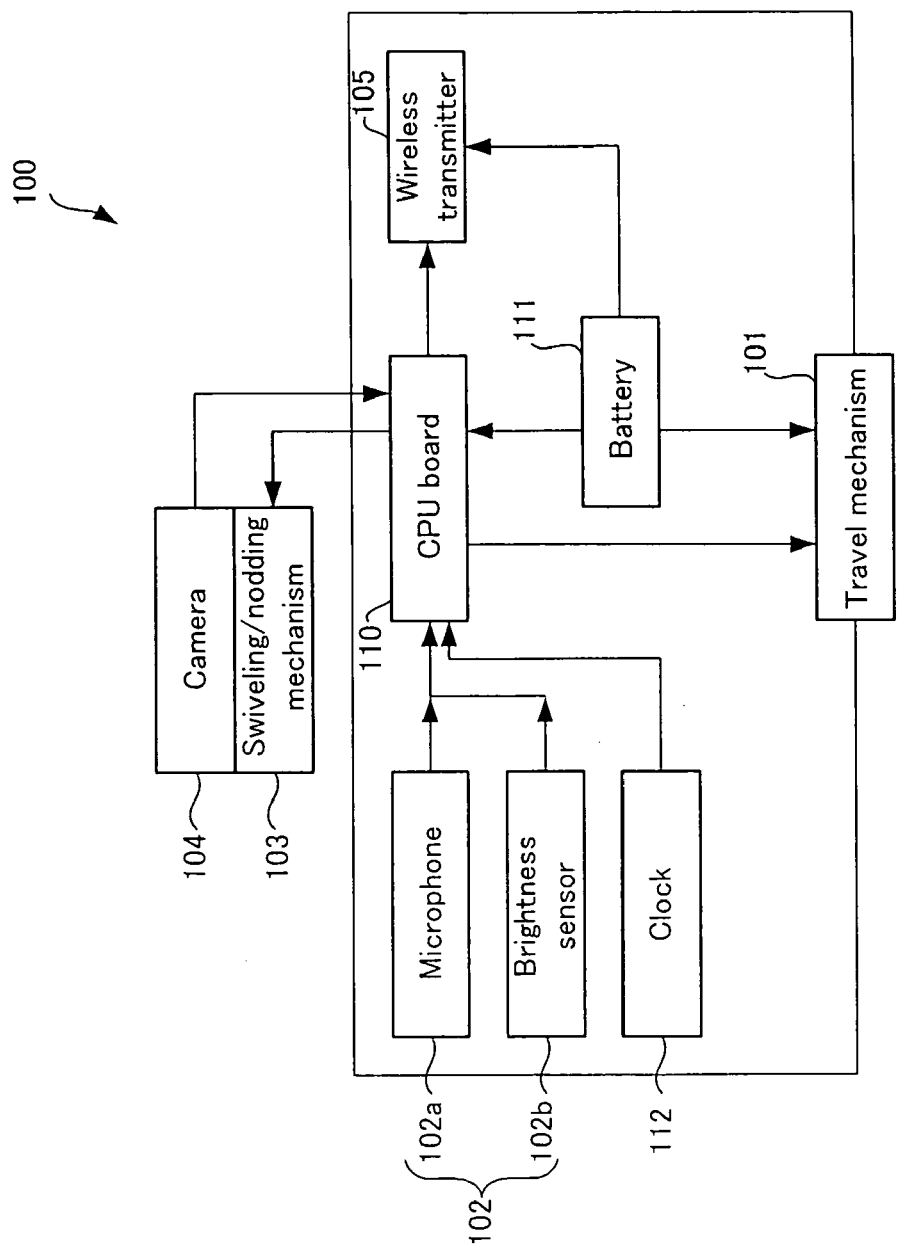
FIG. 2 is a block diagram showing a configuration of the autonomous mobile robot shown in FIG. 1.

According to this embodiment, the sensor 102 has a microphone 102a and brightness sensor 102b as shown in FIG. 2. The microphone 102a collects ambient sounds while the brightness sensor 102b detects the brightness of a surrounding area.

The swiveling/nodding mechanism 103 changes the right-and-left direction and up-and-down direction of the camera 104 which is mounted on it. The camera 104 takes a photograph in the direction in which it is directed by the swiveling/nodding mechanism 103. The wireless transmitter 105 communicates with the terminal 200 via a wireless LAN (Local Area Network) and sends images taken by the camera 104 as well as sounds and brightness information collected by the sensor 102 (the microphone 102a and the brightness sensor 102b, according to this embodiment) to the terminal 200 (hereinafter, the images, sounds, and brightness information may be referred to collectively as "images and the like").

The terminal 200 is equipped with a wireless receiver 201, storage device 202, and Internet access device 203. The terminal 200 is fixed at an appropriate location (e.g., on a wall) in the house, for example.

The wireless receiver 201 of the terminal 200 communicates with the wireless transmitter 105 of the autonomous mobile robot 100A via the wireless LAN and receives images and the like from the autonomous mobile robot 100A. The received images and the like are temporarily stored in the storage device 202.

The Internet access device 203 is connected to the Internet via a communications cable 204. When instructions to transfer images and the like are received from a cell phone or the like of the user (owner of the house who is out) via the Internet, the Internet access device 203 sends images and the like stored in the storage device 202 to the requesting cell phone or the like.

FIG. 2 is a block diagram showing a configuration of the autonomous mobile robot 100A shown in FIG. 1.

FIG. 2 shows a CPU board 110, battery 111, and clock 112, which are components not shown in FIG. 1.

The CPU board 110 contains a CPU, I/O (input/output) interface, memory which stores programs executed by the CPU, etc. and controls the entire autonomous mobile robot 100A.

The autonomous mobile robot 100A is configured to operate on power from the battery 111. Although only arrows pointing to the CPU board 110, a wireless communications device 105, and a drive mechanism 101 are drawn from the battery 111 in FIG. 2, this is to avoid complexity of illustration and the battery 111 supplies necessary power to other components as well.

The clock 112 tells the present time. Information about the present time is conveyed from the clock 112 to the CPU board 110.

FIG. 3 is a diagram outlining an operational sequence of the robot system 10A shown in FIG. 1.

To begin with, the autonomous mobile robot 100A of the robot system 10A patrols the house at predetermined times, and thereby takes photographs at predetermined fixed points, photographs suspicious objects, and makes recordings (Step a).

Photographed images and recorded sounds thus obtained (images and the like) are sent to the station 200 and accumulated in the storage device 202 (see FIG. 1) of the station 200 (Step b).

Furthermore, upon request from the user (cell phone or the like) on the Internet, data (images and the like) accumulated in the storage device 202 of the station 200 is sent to the user (cell phone or the like) (Step c).

Next, the operational sequence shown in FIG. 3 will be described in detail.

FIG. 4 is a diagram showing an operation timetable.

The figure shows times at which the autonomous mobile robot 100A starts to patrol the house and patrol route numbers which identify patrol routes, by putting them in correspondence. The operation timetable is stored in a memory in the CPU board 110.

FIG. 5 is a diagram showing an example of a patrol schedule.

The patrol schedule specifies places to be checked according to a patrolling sequence beginning with the living room and finally returning to the living room. For each place to be checked, the patrol schedule specifies whether to take still images, whether to take moving images, in what direction the camera should be pointed (photographing direction) in the case of still picture photography or motion picture photography, whether to make a recording, how long motion picture photography or recording should be continued, and whether to measure brightness.

The patrol schedule shown in FIG. 5 corresponds to patrol route number A shown in the operation timetable in FIG. 4. A patrol schedule for patrol route number B is also created.

The patrol schedules are stored in the memory in the CPU board 110 shown in FIG. 2 as is the case with the operation timetable shown in FIG. 4.

Figure 6:
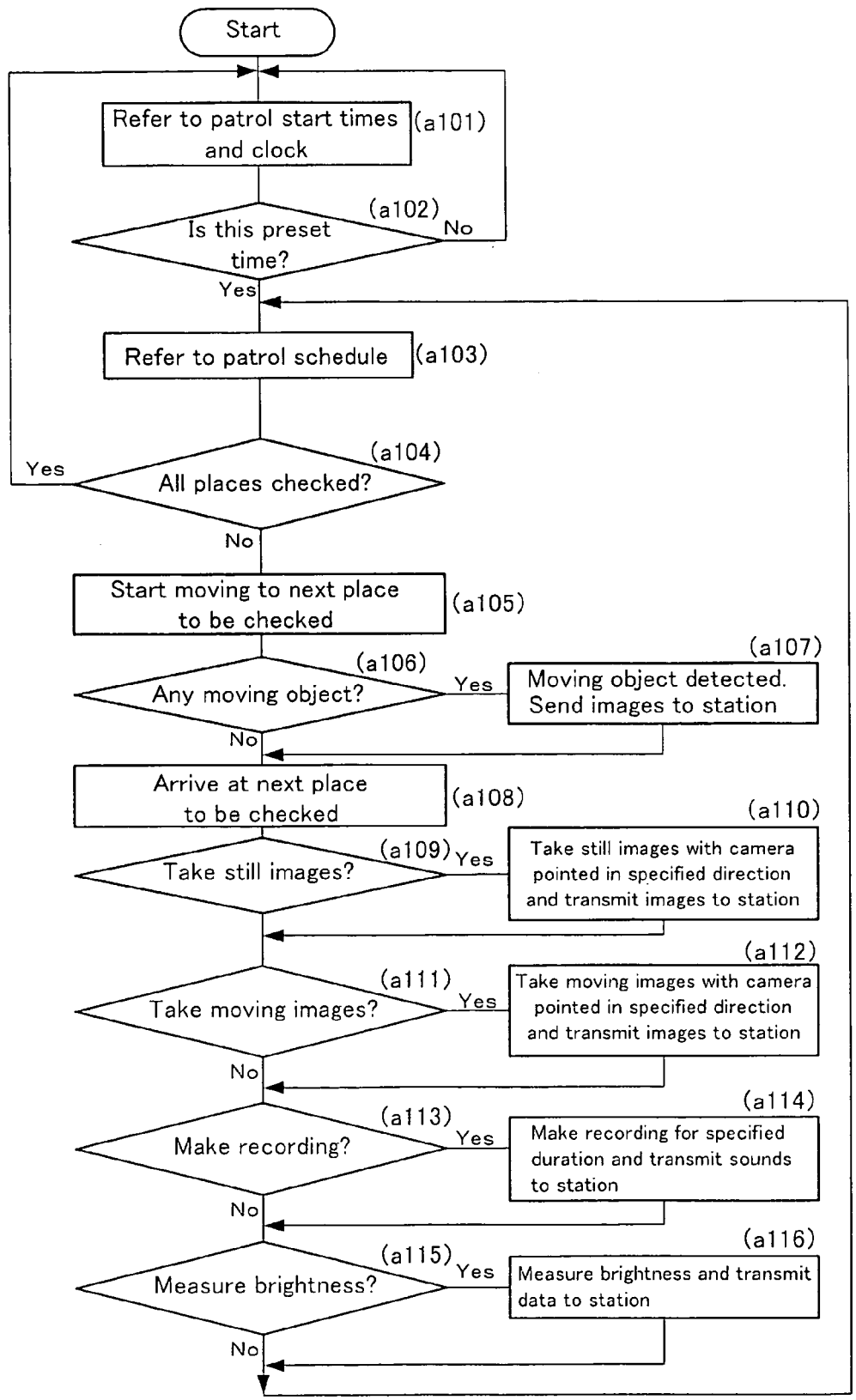
FIG. 6 is a flowchart showing operation of the autonomous mobile robot shown in FIGS. 1 and 2.

FIG. 6 is a flowchart showing operation of the autonomous mobile robot shown in FIGS. 1 and 2. The flowchart in FIG. 6 is a detailed flowchart of Step a in the overview flowchart shown in FIG. 3.

First, by referring to the patrol start times in the operation timetable and the present time indicated by the clock 112 shown in FIG. 4 and FIG. 2 (Step a101), the autonomous mobile robot 100A judges whether the present time matches any of the patrol start times specified in the operation timetable (Step a102).

If the present time matches any of the patrol start times (e.g., it is assumed here that the present time is 10 o'clock), the autonomous mobile robot 100A refers to the patrol schedule (patrol schedule corresponding to patrol route number A in FIG. 5) corresponding to the patrol route number (patrol route number A, in this case) corresponding to the matched patrol start time (10 o'clock, in this case) (Step a103), and performs the following operations while taking a round according to the patrol schedule (Step a104).

To begin with, the autonomous mobile robot 100A starts moving to the next place to be checked (Step a105). In this case, the autonomous mobile robot 100A moves first to the living room. If the autonomous mobile robot is already located in the living room, Step a105 is skipped.

Even when the autonomous mobile robot 100A is moving to the next place to be checked, the camera 104 continues to operate and pattern matching is performed between two consecutive frames to detect any moving object in the screen (Step a106) except for screen movements resulting from the movement of the robot or changes in the orientation of the camera. If any moving object is detected, its images are sent to the station together with information about the detection of the suspicious object (Step a107).

When the autonomous mobile robot 100A arrives at the next place to be checked (step a108), it judges whether it is instructed to take still images (Step a109), whether it is instructed to take moving images (Step a111), whether it is instructed to make a recording (Step a113), and whether it is instructed to measure brightness (Step a115). If the autonomous mobile robot 100A is instructed to take still images, it points the camera in the direction specified in the patrol schedule, takes still images, and transmits the images to the station (Step a110). If the autonomous mobile robot 100A is instructed to take moving images, it points the camera in the direction specified in the patrol schedule as is the case with still picture photography, takes moving images for a specified duration, and transmits the moving images to the station (Step a112). If the autonomous mobile robot 100A is instructed to make a recording, it makes a recording for a specified duration, and transmits the recorded sounds to the station (Step a114), If the autonomous mobile robot 100A is instructed to measure brightness, it measure brightness, and transmits the resulting data to the station (Step a116).

When the picture-taking and other operations described above are finished, the autonomous mobile robot 100A returns to Step a103, where it refers to the patrol schedule in FIG. 5 again (Step a103). If the patrol schedule contains places yet to be checked, the autonomous mobile robot 100A moves to the next place to be checked (Step a105), performs the same operations as above. If the autonomous mobile robot 100A has visited all the places to be checked (Step a104), it continues to check time (Steps a101 and a102) until the next patrol time.

Figures 7, 8:
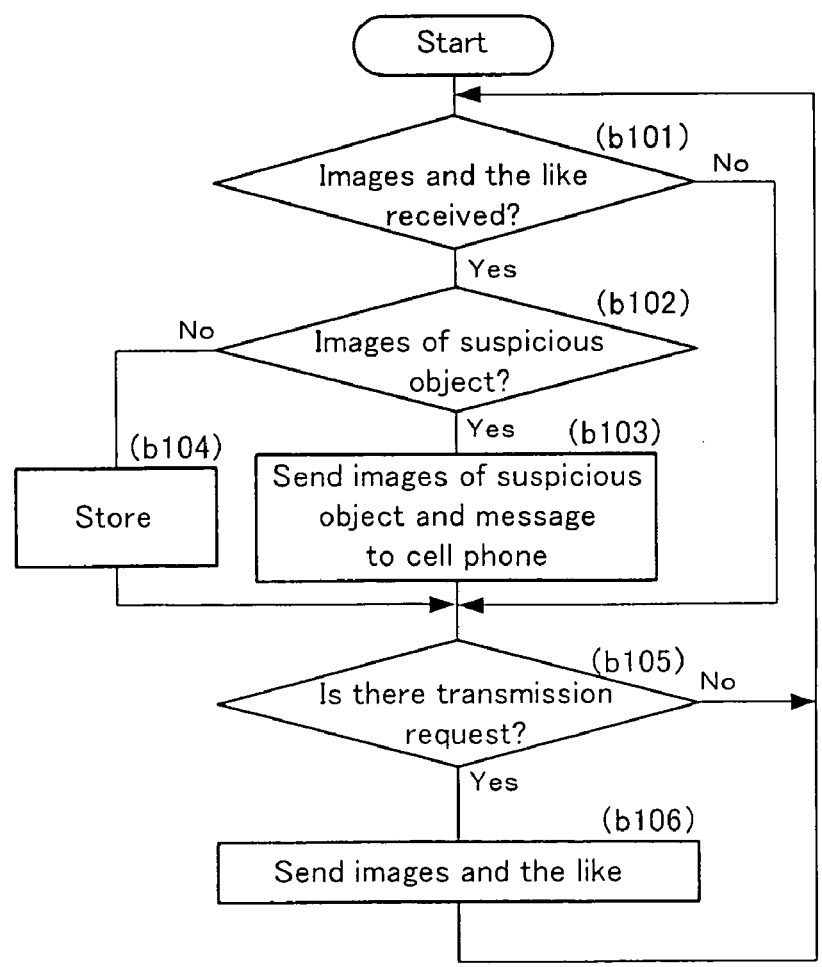
FIG. 7 is a diagram showing contents of a message stored in a storage device of a station.
FIG. 8 is a flowchart showing processes performed at the station shown in FIG. 1.

FIG. 7 is a diagram showing contents of a message stored in the storage device 202 of the station 200.

The message recorded here states "A suspicious object has been detected. Please check."

FIG. 8 is a flowchart showing processes performed at the station shown in FIG. 1. The flowchart in FIG. 8 corresponds to Step b and Step c in the overview flowchart shown in FIG. 3.

Upon receiving images and the like (images, sounds, and brightness data) from the autonomous mobile robot 100A (Step b101), the station judges whether the images show a suspicious object (Step b102). If the images show a suspicious object, the images of the suspicious object and the message shown in FIG. 7 are sent from the Internet access device 203 shown in FIG. 1 to the user's cell phone (Step b103).

If the received images are other than those of a suspicious object, they are stored in the storage device 202 of the station 200 (Step b104).

If a request to send images and the like is received from the user's cell phone or the like (Step b105), the Internet access device 203 sends the images and the like accumulated in the storage device 202 to the user's cell phone or the like via the Internet (step b106).

Figure 9:
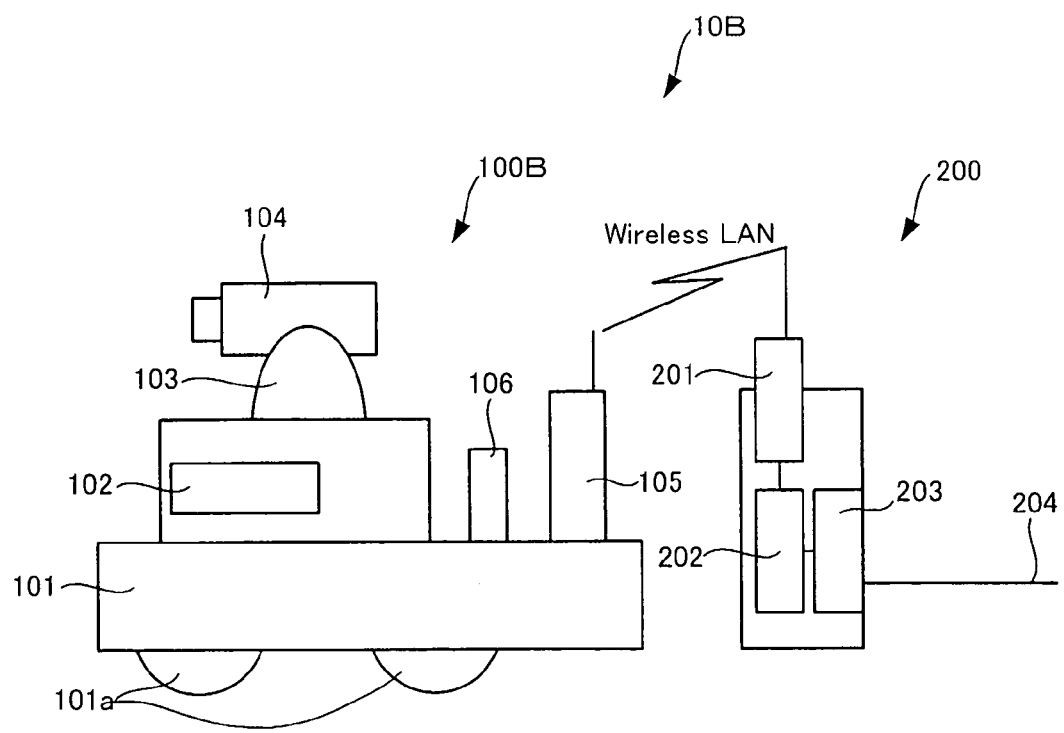
FIG. 9 is a diagram showing a second embodiment of a robot system according to the present invention.

FIG. 9 is a diagram showing a second embodiment of a robot system according to the present invention.

The same components as those in the first embodiment described with reference to FIGS. 1 to 8 are denoted by the same reference numerals as those in the first embodiment and differences from the first embodiment will be described.

An autonomous mobile robot 100B of the robot system 10B shown in FIG. 9 is equipped with a storage device 106 in addition to the same components as those of the autonomous mobile robot 100A in shown FIG. 1. Except the storage device 106, other components of the autonomous mobile robot 100B and station 200 are the same as those of the robot system 10A in FIG. 1.

Figure 10:
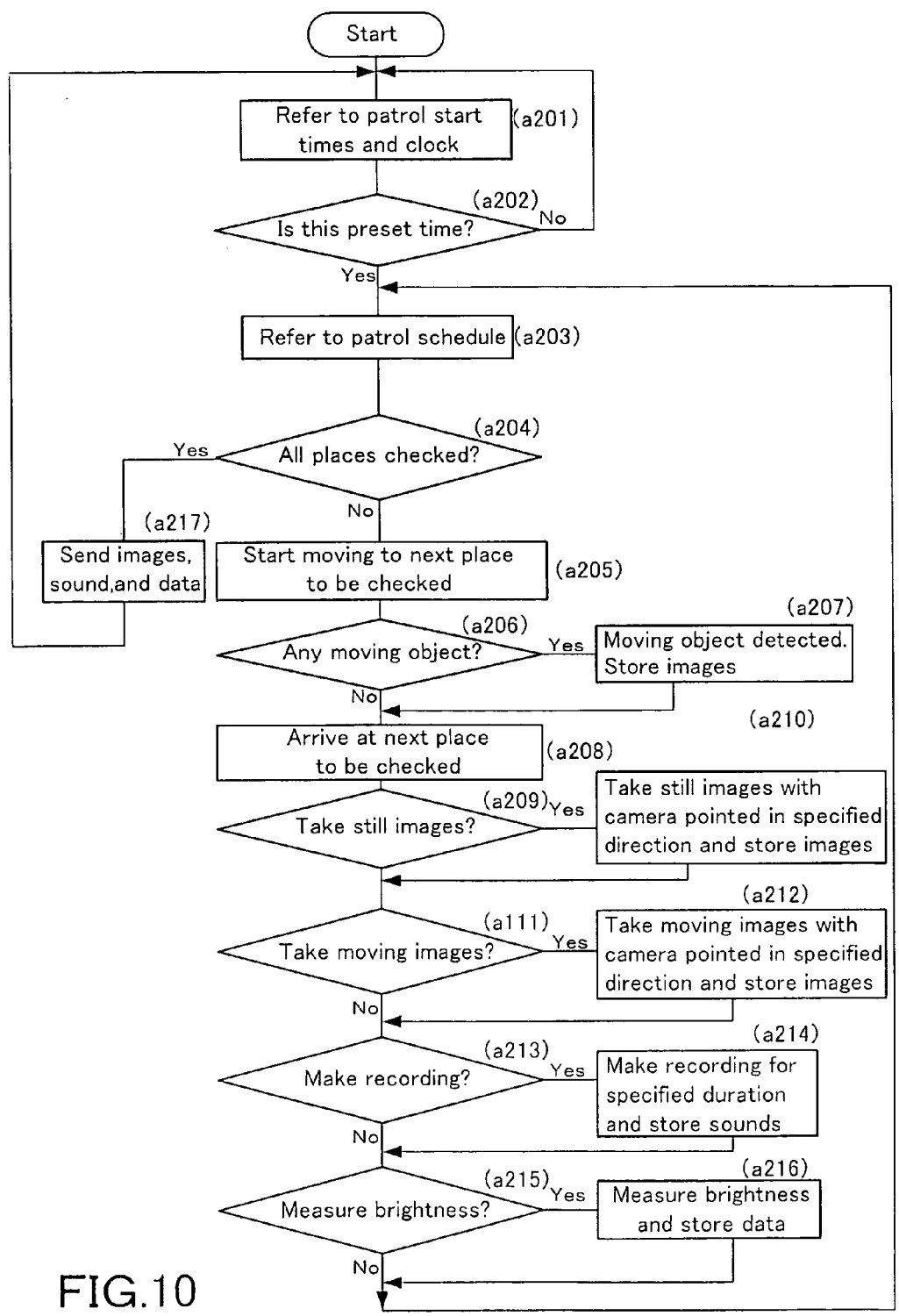
FIG. 10 is a flowchart showing operation of an autonomous mobile robot in the robot system shown in FIG. 9.

FIG. 10 is a flowchart showing operation of the autonomous mobile robot 100B in the robot system shown in FIG. 9.

Description will focus on differences from the flowchart of the autonomous mobile robot according to the first embodiment in FIG. 6.

Steps a201 to a206, a208, a209, a211, a213, and a215 of the flowchart in FIG. 10 are the same as Steps a101 to a106, a108, a109, a111, a113, and a115 of the flowchart in FIG. 6, respectively, and thus redundant description thereof will be omitted.

In Steps a107, a110, a112, a114, and a116 of the flowchart in FIG. 6, images obtained by photography, collected sounds, brightness, measurement data, etc. are transmitted directly to the station, but in Steps a207, a210, a212, a214, and a216 of the flowchart in FIG. 10, although images are taken, sounds are collected, and brightness is measured, the resulting images and the like are stored temporarily in the storage device 106 shown in FIG. 9 instead of being transmitted directly to the station. According to this embodiment, images of suspicious objects are treated equally to other images instead of receiving special treatment.

When the autonomous mobile robot 100B has visited all the places to be checked, images and the like stored in the storage device 106 are sent to the station 200 (Step a217).

In this case, if the station is positioned near the last place to be checked, the autonomous mobile robot can also include places where it cannot communicate with the station in the patrol route.

Figure 11:
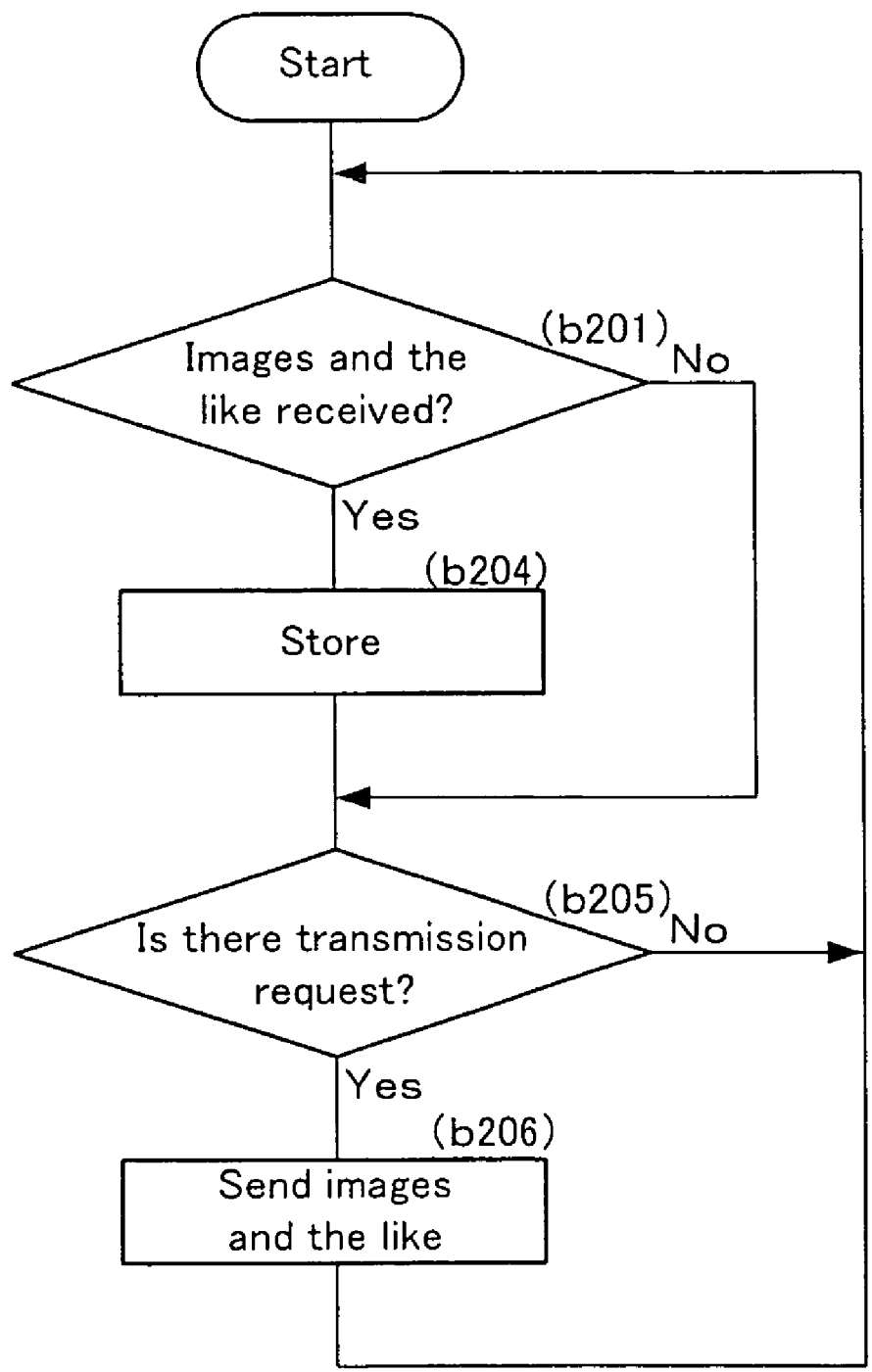
FIG. 11 is a flowchart showing processes performed at a station in the robot system shown in FIG. 9.

FIG. 11 is a flowchart showing processes performed at the station 200 in the robot system 10B shown in FIG. 9.

Description will be given in comparison with the flowchart in FIG. 8 which shows the processes performed at the station according to the first embodiment.

According to the second embodiment, since images of suspicious objects are treated equally to other images, there is no step in FIG. 11 that would correspond to Step b102 or Step b103 of the flowchart in FIG. 8. Steps a201 and a204 to a206 of the flowchart in FIG. 11 are the same as Steps a101 and a104 to a106 of the flowchart in FIG. 8, respectively, and thus description thereof will be omitted.

Incidentally, even in the second embodiment, if images and the like transmitted to the station contain images of a suspicious object, the existence of the suspicious object may be reported to the user immediately without waiting for access by the user.

Also, although according to the second embodiment in FIGS. 9 to 11, images and the like are transmitted to the station after the autonomous mobile robot 100B has visited all the places to be checked, the autonomous mobile robot 100B may transmit the images and the like stored in its storage device 106 to the station even in the middle of patrol if the autonomous mobile robot 100B is located at a place where it can communicate with the station.

Figure 12:
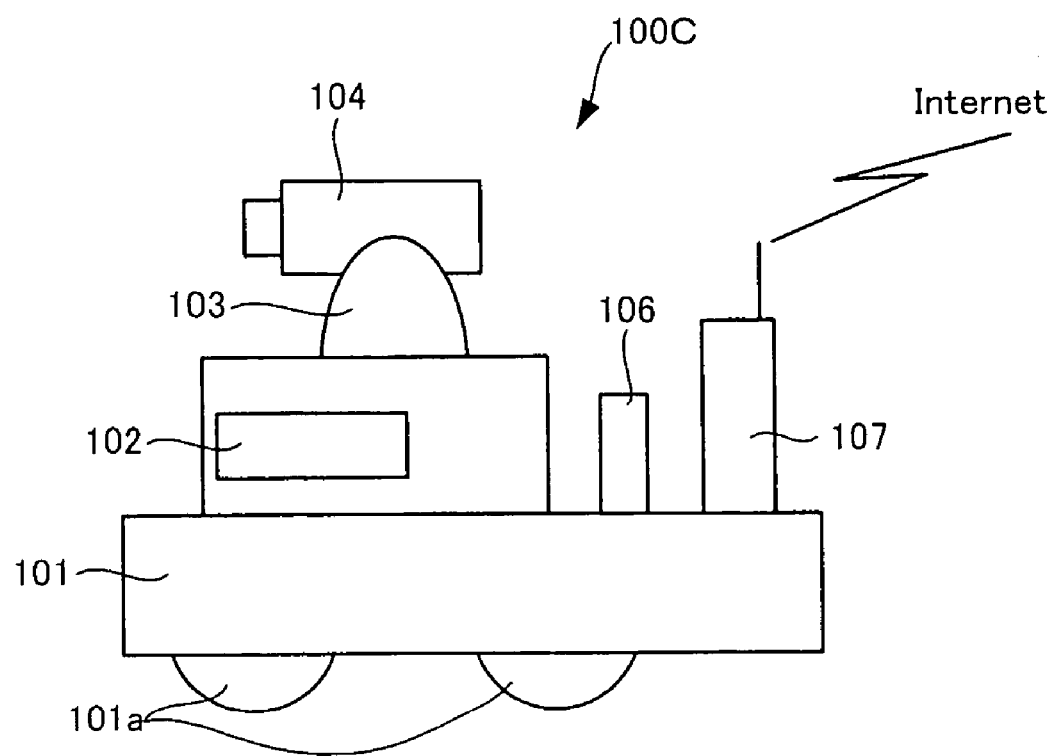
FIG. 12 is a diagram showing a first embodiment of an autonomous mobile robot according to the present invention.

FIG. 12 is a diagram showing a first embodiment of an autonomous mobile robot according to the present invention. The same components as those of the autonomous mobile robot 100A in the first embodiment of the robot system 10A shown in FIG. 1 are denoted by the same reference numerals as those of the autonomous mobile robot 100A and only differences from the autonomous mobile robot 100A shown in FIG. 1 will be described here.

The autonomous mobile robot 100C shown in FIG. 12 combines the autonomous mobile robot 100A and functionality of the station 200 in the robot system shown in FIG. 1, as it were. That is, compared to the autonomous mobile robot 100A of the robot system 10A in FIG. 1, the autonomous mobile robot 100C in FIG. 12 additionally includes the storage device 106 and is equipped with a communications device 107 for wireless access to the Internet instead of the wireless communications device 105 attached to the autonomous mobile robot 100A in FIG. 1. Other components of the autonomous mobile robot 100C in FIG. 12 are the same as those of the autonomous mobile robot 100A in the robot system 10A shown in FIG. 1.

Figure 13:
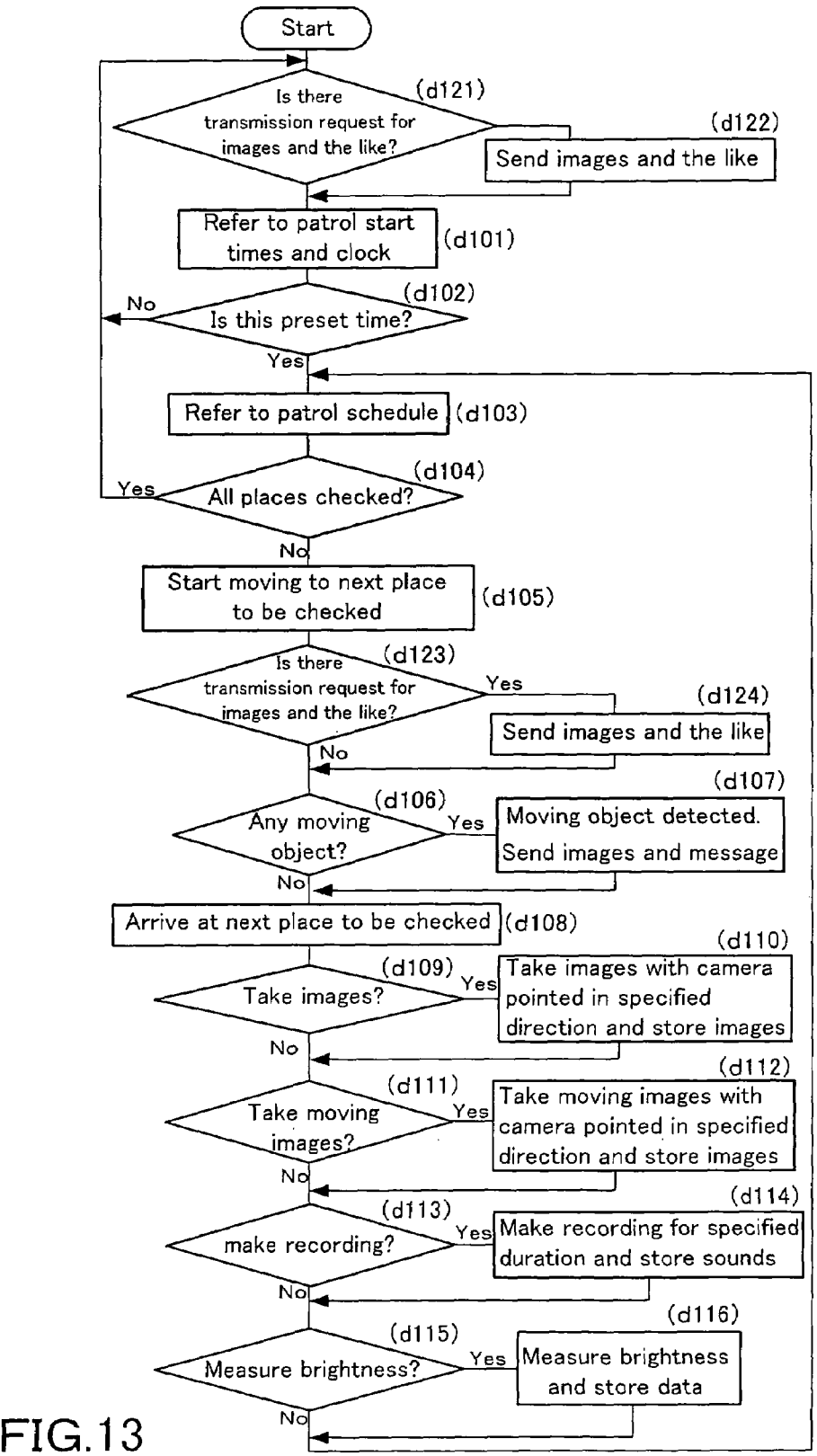
FIG. 13 is a flowchart showing operation of the autonomous mobile robot shown in FIG. 12.

FIG. 13 is a flowchart showing operation of the autonomous mobile robot shown in FIG. 12. Description will be given in comparison with FIG. 6 which shows the flowchart of the autonomous mobile robot 100A in the robot system 10A in FIG. 1.

According to the flowchart in FIG. 13, when the autonomous mobile robot 100C is not patrolling, it monitors for any transmission request for images and the like made by the user's cell phone or the like via the Internet (Step d121). Also, it checks whether a patrol start time has arrived (Steps d101 and d102) as in the case of the flowchart in FIG. 6.

If a transmission request for images and the like is received from the user's cell phone or the like, the images and the like accumulated in the storage device 106 are sent to the user's cell phone or the like via the Internet (Step d122).

By referring to the operation timetable (see FIG. 4) and clock 112 (see FIG. 2) (Step d101), when time to start a patrol arrives (Step d102), the autonomous mobile robot 100C starts a patrol with reference to the patrol schedule (see FIG. 4).

Steps d101 to d105 of the flowchart in FIG. 13 are the same as Steps a101 to a105 of the flowchart in FIG. 6, respectively, and thus any further description thereof will be omitted.

If a transmission request for images and the like is received from the user's cell phone or the like (Step d123), the images and the like accumulated in the storage device 106 are sent to the requesting cell phone or the like via the Internet (Step d124).

Steps d106 to d116 of the flowchart in FIG. 13 correspond to Steps a106 to a116 of the flowchart in FIG. 6, respectively. However, although the photographed images, recorded sounds, and measured brightness data are sent to the station in Steps a107, a110, a112, a114, and a116 of the flowchart in FIG. 6, the photographed images, recorded sounds, and measured brightness data are stored in the storage device 106 in corresponding Steps d107, d110, d112, d114, and d116 of the flowchart in FIG. 13. The images and the like stored in the storage device 106 are sent directly to the user's cell phone or the like via the Internet in Step d122 or Step d124 unlike in FIG. 1 in which the station 200 is used.

Figure 14:
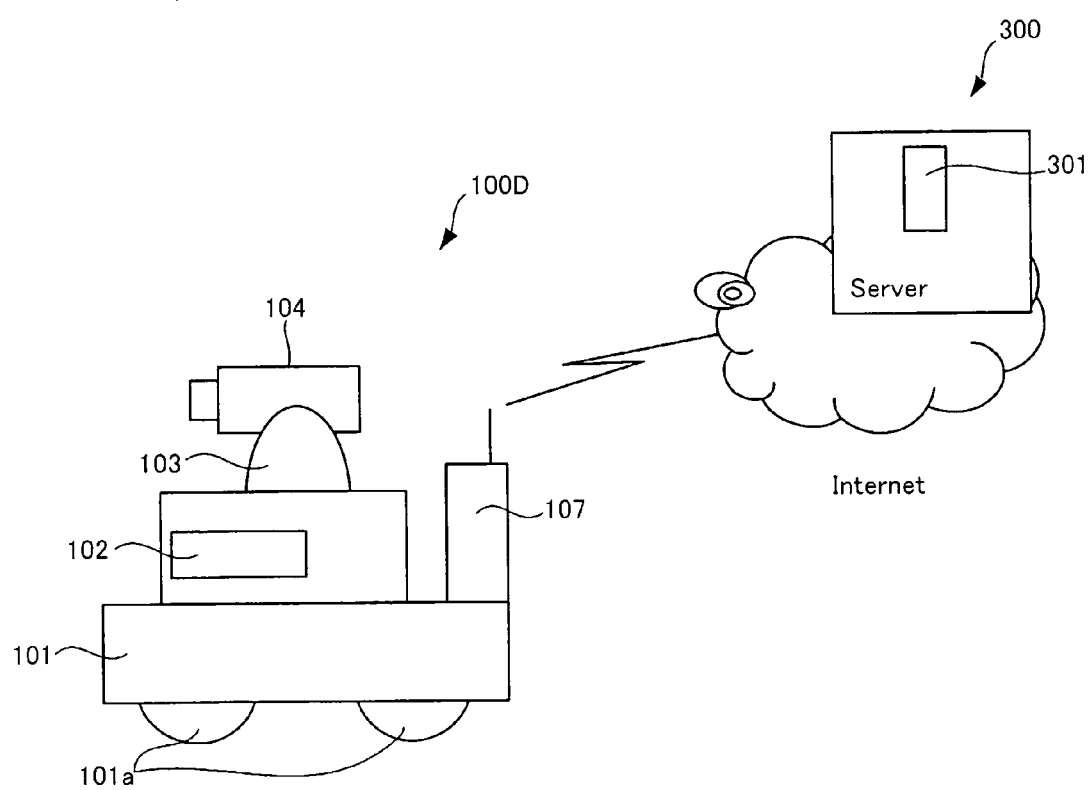
FIG. 14 is a diagram showing a second embodiment of an autonomous mobile robot according to the present invention.

FIG. 14 is a diagram showing a second embodiment of an autonomous mobile robot according to the present invention. The same components as those of the autonomous mobile robot 100C—the first embodiment of the present invention—shown in FIG. 12 are denoted by the same reference numerals as those of the autonomous mobile robot 100C and only differences from the autonomous mobile robot 100C shown in FIG. 12 will be described here.

The autonomous mobile robot 100D shown in FIG. 14 uses, so to speak, a server 300 on the Internet instead of the station in the robot system shown in FIG. 1 and accumulates images and the like in a storage device 301 of the server 300. That is, the autonomous mobile robot 100D in FIG. 14 does not have the storage device 106 possessed by the autonomous mobile robot 100C shown in FIG. 12. The other components of the autonomous mobile robot 100D in FIG. 14 are the same as those of the autonomous mobile robot 100C shown in FIG. 12.

Figure 15:
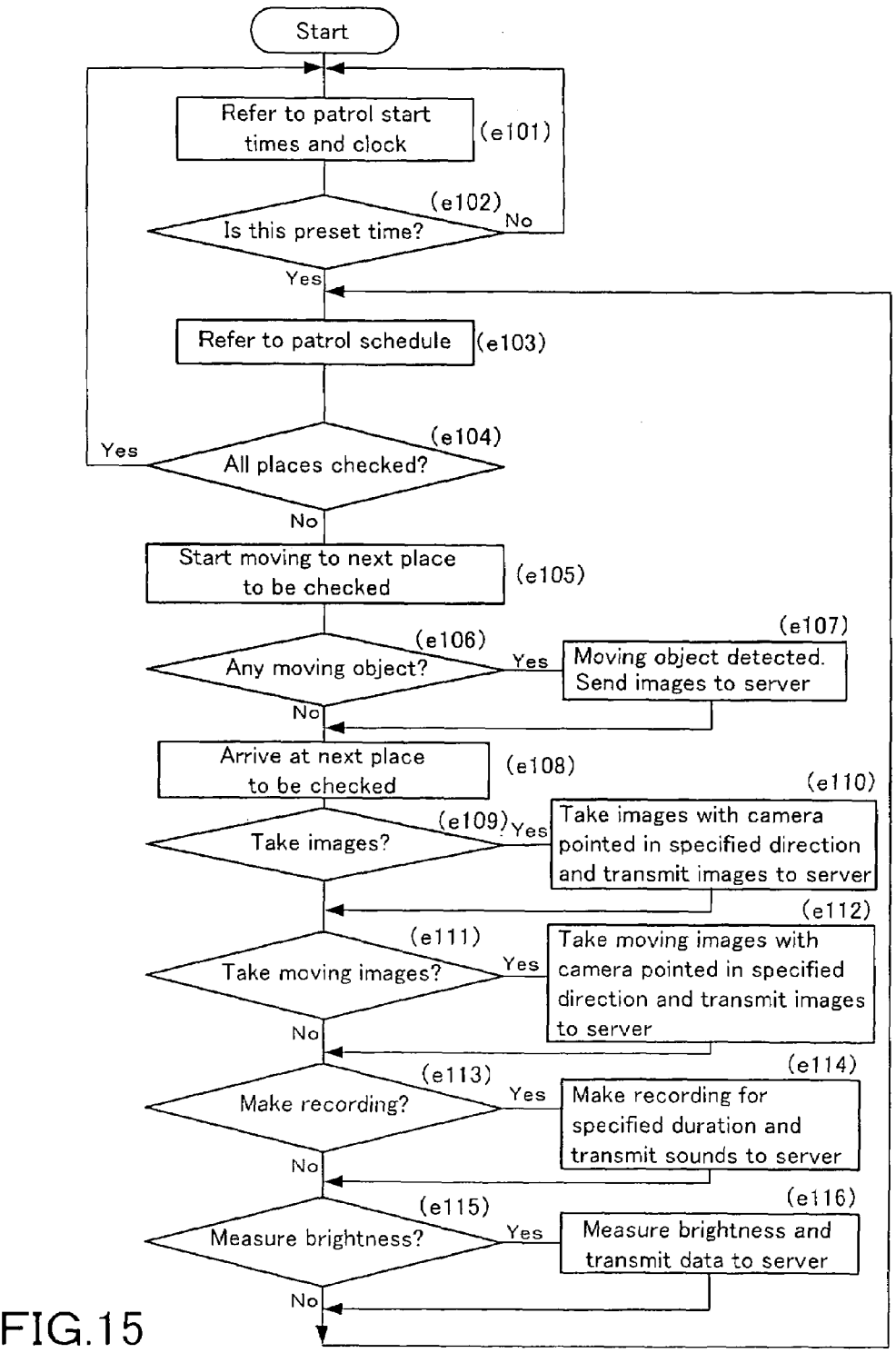
FIG. 15 is a flowchart showing operation of the autonomous mobile robot shown in FIG. 14.

FIG. 15 is a flowchart showing operation of the autonomous mobile robot shown in FIG. 14. Only differences will be described here in comparison with the flowchart in FIG. 6 which shows the processes performed by the autonomous mobile robot 100A of the robot system 10A in FIG. 1.

Steps e101 to e116 of the flowchart in FIG. 15 which shows the processes performed by the autonomous mobile robot 100D shown in FIG. 14 correspond, respectively, to Steps a101 to a116 of the flowchart in FIG. 6 (which shows the processes performed by the autonomous mobile robot 100A of the robot system 10A in FIG. 1). The difference is that in Steps e107, e110, e112, e114, and e116 in FIG. 15, the photographed images, recorded sounds, and measured brightness data are transmitted to the server 300 by the communication device 107 via the Internet and stored in the storage device 301 of the server 300 whereas in Steps a107, a110, a112, a114, and a116 of the flowchart in FIG. 6, the images and the like are sent to the station 200 shown in FIG. 6. The user is supposed to access the server 300 using a cell phone or the like and receive from the server 300 the images and the like stored in the storage device 301 of the server 300. If the images and the like sent from the autonomous mobile robot 100D contain images of a suspicious object, the server 300 may send the images of the suspicious object and a message to the user's cell phone or the like on its own initiative as in the case of Steps a102 and a103 of the station's process flowchart shown in FIG. 8.

In the above embodiments, the autonomous mobile robots are equipped with a brightness sensor for the convenience of detecting any room light left on. However, the environmental sensor according to the present invention is not limited to a brightness sensor and the present invention may adopt various environmental sensors, including a gas sensor used to detect gas leakage, a temperature sensor used to detect an air conditioner left on, etc.

Also, in the above embodiments, any moving object detected in images taken by the camera is judged to be suspicious. Alternatively, the autonomous mobile robot may incorporate a map and judge any object not registered in the incorporated map as being suspicious.

The invention claimed is:

1. A robot system comprising an autonomous mobile robot which is freely movable and station which wirelessly communicates with the autonomous mobile robot, wherein:

the autonomous mobile robot comprises:
a travel mechanism which moves the robot,
a camera which photographs surroundings,
a control section which makes the autonomous mobile robot travel along a predetermined path at predetermined times through a plurality of rooms and makes the camera take photographs at predetermined locations during the travel along the predetermined path through the plurality of rooms, and a sending section which sends the images taken by the camera to the station; and the station comprises:
   a receiving section which receives the images sent from the autonomous mobile robot,
   a storage section which stores the images received by the receiving section, and
   a communications section which communicates with external devices via a communications line and sends the images stored in the storage section to a requesting external device in response to a transmission request from the external device.

2. The robot system according to claim 1, wherein the camera takes moving images as well as still images.

3. The robot system according to claim 1, wherein the sending section sends images via a wireless LAN.

4. The robot system according to claim 1, wherein:
   the autonomous mobile robot comprises a storage section which stores the images taken by the camera; and
   the sending section sends the images stored in the storage section when communications with the receiving section are enabled.

5. The robot system according to claim 1, wherein the autonomous mobile robot in the robot system comprises a suspicious-object detecting section which detects suspicious objects whose existence is not expected.

6. The robot system according to any of claim 5, wherein the control section makes the camera photograph any suspicious object detected by the suspicious-object detecting section.

7. The robot system according to claim 5, wherein: the sending section notifies the station about any suspicious object detected by the suspicious-object detecting section; and when the receiving section of the station receives the notification about the detection of the suspicious object, the communications section of the station sends a message about the detection of the suspicious object to an external device.

8. The robot system according to claim 1, wherein:
   the autonomous mobile robot comprises a sound sensor which collects sounds;
   the control section makes the sound sensor collect sounds at predetermined locations when the autonomous mobile robot is traveling along the predetermined path, and the sending section sends the sounds collected by the sound sensor to the station;
   the receiving section receives the sounds sent from the autonomous mobile robot, the storage section stores the sounds received by the receiving section, and the communications section sends the sounds stored in the storage section to the requesting external device.

9. The robot system according to claim 1, wherein:
   the autonomous mobile robot comprises an environmental sensor which detects conditions of surrounding environment, the control section makes the environmental sensor detect conditions of surrounding environment at predetermined locations when the autonomous mobile robot is traveling along the predetermined path, and the sending section sends environmental information obtained by the environmental sensor to the station; and
   the receiving section receives the environmental information sent from the autonomous mobile robot, the storage section stores the environmental information received by the receiving section, and the communications section sends the environmental information stored in the storage section to the requesting external device.

10. An autonomous mobile robot which is freely movable, comprising:
   a travel mechanism which moves the robot;
   a camera which photographs surroundings;
   a control section which makes the autonomous mobile robot travel along a predetermined path at predetermined times through a plurality of rooms and makes the camera take photographs at predetermined locations during the travel along the predetermined path through the plurality of rooms;
   a storage section which stores the images taken by the camera; and
   a communications section which communicates with external devices via a communications line and sends the images stored in the storage section to a requesting external device in response to a transmission request from the external device.

11. The autonomous mobile robot according to claim 10, wherein the camera takes moving images as well as still images.

12. The autonomous mobile robot according to claim 10, comprising:
   a storage section which stores the images taken by the camera, wherein
   the communications section sends the images stored in the storage section when communications via the communications line are enabled.

13. The autonomous mobile robot according to claim 10, comprising a suspicious-object detecting section which detects suspicious objects whose existence is not expected.

14. The autonomous mobile robot according to claim 13, wherein the control section makes the camera photograph any suspicious object detected by the suspicious-object detecting section.

15. The autonomous mobile robot according to claim 13, wherein if any suspicious object is detected by the suspicious-object detecting section, the communications section sends a message about the detection of the suspicious object.

16. The autonomous mobile robot according to claim 10, comprising a sound sensor which collects sounds,
   wherein the control section makes the sound sensor collect sounds at predetermined locations when the autonomous mobile robot is traveling along the predetermined path; the storage section stores the sounds collected by the sound sensor; and the communications section sends the sounds stored in the storage section to the requesting external device.

17. The autonomous mobile robot according to claim 10, comprising an environmental sensor which detects conditions of surrounding environment,
   wherein: the control section makes the environmental sensor detect conditions of surrounding environment at predetermined locations when the autonomous mobile robot is traveling along the predetermined path; the storage section stores environmental information obtained by the environmental sensor; and the communications section sends the environmental information stored in the storage section to the requesting external device.

18. An autonomous mobile robot which is freely movable, comprising:
   a travel mechanism which moves the robot;
   a camera which photographs surroundings;
   a control section which makes the autonomous mobile robot travel along a predetermined path at predetermined times through a plurality of rooms and makes the camera take photographs at predetermined locations during the travel along the predetermined path through the plurality of rooms; and a communications section which communicates with an external image server connected via a communications line and sends the images taken by the camera to the external image server, where the external image server sends images to external devices in response to requests from the external devices.

19. The autonomous mobile robot according to claim 18, comprising a sound sensor which collects sounds, wherein the control section makes the sound sensor collect sounds at predetermined locations when the autonomous mobile robot is traveling along the predetermined path; and the communications section sends the sounds collected by the sound sensor to the image server.

20. The autonomous mobile robot according to claim 18, comprising an environmental sensor which detects conditions of surrounding environment, wherein: the control section makes the environmental sensor detect conditions of surrounding environment at predetermined locations when the autonomous mobile robot is traveling along the predetermined path; and the communications section sends environmental information obtained by the environmental sensor to the image server.

21. An autonomous mobile robot having a camera and a travel mechanism to freely move the robot, comprising:

a control section which makes the autonomous mobile robot patrol along a predetermined path at predetermined times through a plurality of rooms and makes the camera take photographs at predetermined locations during the patrol along the predetermined path through the plurality of rooms;

a storage section which stores the photographs taken by the camera; and a communications section which communicates with external devices via a communications line and sends the photographs stored in the storage section to a requesting external device in response to a transmission request from the external device.

22. An autonomous mobile robot having a camera and a travel mechanism to freely move the robot, comprising:

a control section which makes the autonomous mobile robot patrol along a predetermined path at predetermined times through a plurality of rooms and makes the camera take photographs at predetermined locations during the patrol along the predetermined path through the plurality of rooms; and a communications section which communicates with an external image server connected via a communications line and sends the photographs taken by the camera to the external image server, where the external image server sends photographs to external devices in response to requests from the external devices.

* * * * *